(12) United States Patent
Futaki et al.

(10) Patent No.: US 10,034,189 B2
(45) Date of Patent: Jul. 24, 2018

(54) METHOD AND SYSTEM FOR CONTROLLING RADIO PARAMETER, NETWORK OPERATION MANAGEMENT APPARATUS, AND RADIO STATION

(71) Applicant: NEC Corporation, Tokyo (JP)

(72) Inventors: Hisashi Futaki, Tokyo (JP); Hiroto Sugahara, Tokyo (JP); Kosei Kobayashi, Tokyo (JP); Yoshinori Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/781,744

(22) PCT Filed: Mar. 31, 2014

(86) PCT No.: PCT/JP2014/001877
§ 371 (c)(1),
(2) Date: Oct. 1, 2015

(87) PCT Pub. No.: WO2014/162722
PCT Pub. Date: Oct. 9, 2014

(65) Prior Publication Data
US 2016/0037370 A1    Feb. 4, 2016

(30) Foreign Application Priority Data

Apr. 1, 2013    (JP) .................................. 2013-076149

(51) Int. Cl.
*H04W 24/10*    (2009.01)
*H04W 16/18*    (2009.01)
(Continued)

(52) U.S. Cl.
CPC .......... *H04W 24/10* (2013.01); *H04W 16/18* (2013.01); *H04W 24/02* (2013.01); *H04W 24/08* (2013.01);
(Continued)

(58) Field of Classification Search
CPC ..................................................... H04W 24/10
See application file for complete search history.

(56) References Cited

U.S. PATENT DOCUMENTS

2012/0165024 A1    6/2012    Sugahara et al.
2012/0327909 A1    12/2012    Koike et al.
(Continued)

FOREIGN PATENT DOCUMENTS

| EP | 2 549 790 A1 | 1/2013 |
| EP | 2 624 621 A1 | 8/2013 |

(Continued)

OTHER PUBLICATIONS

International Search Report corresponding to PCT/JP2014/001877, dated Jul. 1, 2014 (5 pages).
(Continued)

*Primary Examiner* — John Blanton
(74) *Attorney, Agent, or Firm* — Wilmer Cutler Pickering Hale and Dorr LLP

(57) ABSTRACT

A method and a radio parameter control system, as well as a network operation management apparatus and a radio station, are provided that enable optimization control for problems varying with sites of occurrence. Using location information at the time of measurement included in a measurement report from a radio terminal (30) located in a radio cell (C10), quality indicators based on measurement information acquired by the radio terminals or the radio station are compiled in association with areas (Ai), each of which is smaller than the radio cell (C10), and control of a radio parameter is performed in the radio cell or across a plurality of radio cells, based on a result of compilation of the quality indicators for each area.

17 Claims, 11 Drawing Sheets

(51) Int. Cl.

| | | |
|---|---|---|
| *H04W 24/02* | (2009.01) | |
| *H04W 24/08* | (2009.01) | |
| *H04W 64/00* | (2009.01) | |
| *H04W 72/08* | (2009.01) | |
| *H04W 28/18* | (2009.01) | |
| *H04W 84/18* | (2009.01) | |
| *H04W 88/02* | (2009.01) | |
| *H04L 1/00* | (2006.01) | |

(52) U.S. Cl.
CPC ........... *H04W 28/18* (2013.01); *H04W 64/00* (2013.01); *H04W 72/085* (2013.01); *H04L 1/0001* (2013.01); *H04W 84/18* (2013.01); *H04W 88/02* (2013.01)

(56) References Cited

U.S. PATENT DOCUMENTS

| | | | |
|---|---|---|---|
| 2013/0196650 A1 | 8/2013 | Futaki | |
| 2014/0286203 A1* | 9/2014 | Jindal | ................ H04J 11/0026 370/278 |
| 2016/0057634 A1* | 2/2016 | Sugahara | ............. H04W 24/02 370/252 |

FOREIGN PATENT DOCUMENTS

| | | |
|---|---|---|
| JP | 2011-525326 A | 9/2011 |
| JP | 2012-114916 A | 6/2012 |
| JP | 2012-231236 A | 11/2012 |
| WO | WO-2011/114372 A1 | 9/2011 |
| WO | WO-2012/043796 A1 | 4/2012 |
| WO | WO-2012/090467 A1 | 7/2012 |
| WO | WO-2012/144338 A1 | 10/2012 |

OTHER PUBLICATIONS

3GPP TR 36.902 V9.3.0, Technical Specification Group Radio Access Network; Evolved Universal Terrestrial Radio Access Network (E-UTRAN); Self-Configuring and Self-Optimizing Network (SON) Use Cases and Solutions (Release 9), Dec. 2010, pp. 1-21.

3GPP TS 36.300 V11.4.0, Technical Specification Group Radio Access Network; Evolved Universal Terrestrial Radio Access (E-UTRA) and Evolved Universal Terrestrial Radio Access Network (E-UTRAN); Overall Description; Stage 2 (Release 11), Dec. 2012, pp. 1-207.

Japanese Office Action issued by the Japan Patent Office for Japanese Application No. 2015-509909 dated Feb. 7, 2018 (5 pages).

* cited by examiner

METHOD AND SYSTEM FOR CONTROLLING RADIO PARAMETER, NETWORK OPERATION MANAGEMENT APPARATUS, AND RADIO STATION

CROSS-REFERENCE TO RELATED APPLICATIONS

This application is a national stage application of International Application No. PCT/JP2014/001877 entitled "Method and System for Controlling Radio Parameter, Network Operation Management Apparatus, and Radio Station," filed on Mar. 31, 2014, which claims the benefit of the priority of Japanese Patent Application No. 2013-076149, filed on Apr. 1, 2013, the disclosures of each which are hereby incorporated by reference in its entirety.

TECHNICAL FIELD

The present invention relates to a radio communication system and, more particularly, to a method and a system for controlling radio parameters of a radio station, as well as to a network operation management apparatus and a radio station.

BACKGROUND ART

In recent years, active studies have been conducted on SON (Self Organizing Network), which autonomously optimizes radio parameters and network configurations in radio communication systems such as cellular systems, in view of operating expense (OPEX) reduction and the like. Standardization of SON functions is under way also in LTE (Long Term Evolution) of 3GPP ($3^{rd}$ Generation Partnership Project) (NPL 1).

SON includes functions such as:
Self-Configuration;
Self-Optimization;
Self-Healing.

These are technologies for accomplishing respective different objectives. Of them, Self-Optimization includes categories such as: optimization of cell coverage and capacity (Coverage and Capacity Optimization: CCO); optimization of handover parameters (Mobility Robustness Optimization: MRO); and optimization of load balancing (Mobility Load Balancing: MLB) (NPL 2). Note that the term "CCO" is also used when only coverage optimization or capacity optimization is intended.

In SON, a problem is recognized by using radio quality information reported from terminals and communication quality statistical information compiled by a base station, and a radio parameter of the base station is autonomously optimized so that the problem will be improved. For the information reported from terminals, those prescribed in 3GPP are used, but many of current studies on SON employ radio quality measured by terminals in radio connected state (RRC Connected state).

On the other hand, 3GPP Release 10 newly prescribes MDT (Minimization of Drive Test) with the view of suppressing (minimizing) drive tests related to radio network operation management to the least extent possible. MDT prescribes an immediate reporting mode (Immediate MDT), in which a terminal in radio connected state performs measurement and reporting, and a recording and reporting mode (Logged MDT), in which a terminal in idle state (RRC Idle state) records a measurement result and reports it when it falls in radio connected state. Moreover, information to be measured includes not only radio quality information but also a measuring terminal's location information.

Accordingly, in SON, it is possible to optimize base station's parameters, based on radio quality information measured by terminals in immediate reporting mode or recording and reporting mode.

Moreover, PTL 1 discloses a method of performing parameter control based on an actual cell size. According to this parameter control method, in order to accurately estimate an actual cell size, a scheme is employed in which measurement information is aggregated for each of preconfigured divided areas and it is determined whether or not each area is within the radio area of a base station.

CITATION LIST

Patent Literature

[PTL 1]
Japanese Patent Application Unexamined Publication No. 2012-231236

Non-Patent Literature

[NPL 1]
3GPP TS36.300 v11.4.0, section 22
(Internet <URL>http:www.3gpp.org/ftp/Specs/html-info/36300.htm)
[NPL 2]
3GPP TR36.902 v9.3.0
(Internet <URL>http:www.3gpp.org/ftp/Specs/html-info/36902.htm)

SUMMARY OF INVENTION

Technical Problem

However, in the above-described SON, quality can be grasped only in units of cell or units of cell pair. Therefore, there are possibilities that problems varying with sites of occurrence, such as handover failure and throughput degradation, are uniformly dealt with, and consequently erroneous SON control is performed For example, referring to FIG. 1, in a system such that radio cells 1 and 2 are adjacent to each other and a pico cell 3 is configured within the radio cell 1, it is assumed that a radio overshoot coverage 5 exists in the radio cell 1 and a radio coverage hole 6 exists in the radio cell 2. In this case, handover failures at a cell edge 4 should be dealt with by handover parameter optimization (MRO), whereas handover failures in the overshoot coverage 5 or the coverage hole 6 should be dealt with by coverage optimization (CCO). However, in the existing SON, handover failures at any location, whether at the cell edge 4 or in the overshoot coverage 5 or the coverage hole 6, are dealt with by handover parameter optimization (MRO).

Similarly, even for the same handover failure, control should be performed to retard a handover trigger at a pico cell edge 7, but to quicken a handover trigger at a pico cell center 8. However, in the existing SON, handover parameter optimization (MRO) is performed in units of cell, regardless of whether at the pico cell edge 7 or at the pico cell center 8.

Moreover, PTL 1 discloses a parameter control method to accurately estimate an actual cell size, but it is not recognized that problems to be dealt with can vary from site to site of occurrence as described above.

Accordingly, an object of the present invention is to provide a radio parameter control method and a system, as well as a network operation management apparatus and a radio station, which enable optimization control for problems varying by site of occurrence.

Solution to Problem

A radio parameter control system according to the present invention is a system for controlling radio parameters of a radio cell that is controlled by a radio station, characterized by comprising: compilation means that compiles quality indicators in association with areas, each of which is smaller than the radio cell, by using location information at a time of measurement included in a measurement report from a radio terminal in the radio cell, wherein the quality indicators are based on measurement information acquired by radio terminals in the radio cell or the radio station; and radio parameter control means that controls a radio parameter of the radio cell or across a plurality of radio cells, based on a result of compilation of the quality indicators for each of the areas.

A radio parameter control method according to the present invention is a method for controlling radio parameters of a radio cell that is controlled by a radio station, characterized by comprising: by compilation means, compiling quality indicators in association with areas, each of which is smaller than the radio cell, by using location information at a time of measurement included in a measurement report from a radio terminal in the radio cell, wherein the quality indicators are based on measurement information acquired by radio terminals in the radio cell or the radio station; and by radio parameter control means, controlling a radio parameter of the radio cell or across a plurality of radio cells, based on a result of compilation of the quality indicators for each of the areas.

A network operation management apparatus according to the present invention is characterized by comprising: compilation means that compiles quality indicators in association with areas, each of which is smaller than a radio cell managed by a radio station, by using location information at a time of measurement included in a measurement report from a radio terminal in the radio cell, wherein the quality indicators are based on measurement information acquired by radio terminals in the radio cell or the radio station; and radio parameter control means that controls a radio parameter of the radio cell or across a plurality of radio cells, based on a result of compilation of the quality indicators for each of the areas.

A radio station according to the present invention is a radio station controlling a radio cell, characterized by comprising: compilation means that compiles quality indicators in association with areas, each of which is smaller than the radio cell, by using location information at a time of measurement included in a measurement report from a radio terminal in the radio cell, wherein the quality indicators are based on measurement information acquired by radio terminals in the radio cell or the radio station; and radio parameter control means that controls a radio parameter of the radio cell or across a plurality of radio cells based on a result of compilation of the quality indicators for each of the areas.

Advantageous Effects of Invention

According to the present invention, quality indicators are compiled in association with areas, each of which is narrower than units of cells, by using location information on radio terminals, thus enabling optimization control for problems varying by site of occurrence.

DESCRIPTION OF EMBODIMENTS

According to exemplary embodiments of the present invention, quality indicators based on measurement information such as radio wave quality acquired by radio terminals or radio stations, are compiled in association with areas, each of which is smaller (i.e., narrower) than units of cells by using location information included in measurement reports from the radio terminals, whereby it is possible to grasp problems. Further, a policy against a problem in an area of interest is determined, and based on this, a radio parameter control policy of the radio station is determined, thus enabling optimization control for problems varying by site of occurrence. Hereinafter, exemplary embodiments of the present invention will be described in detail by using 3GPP LTE (Long Term Evolution) and UMTS (Universal Mobile Telecommunications System) systems as examples.

1. First Exemplary Embodiment

First, an architecture and operations according to the present exemplary embodiment will be described with reference to FIGS. 2 and 3.

1.1) System Architecture

Figure 1:
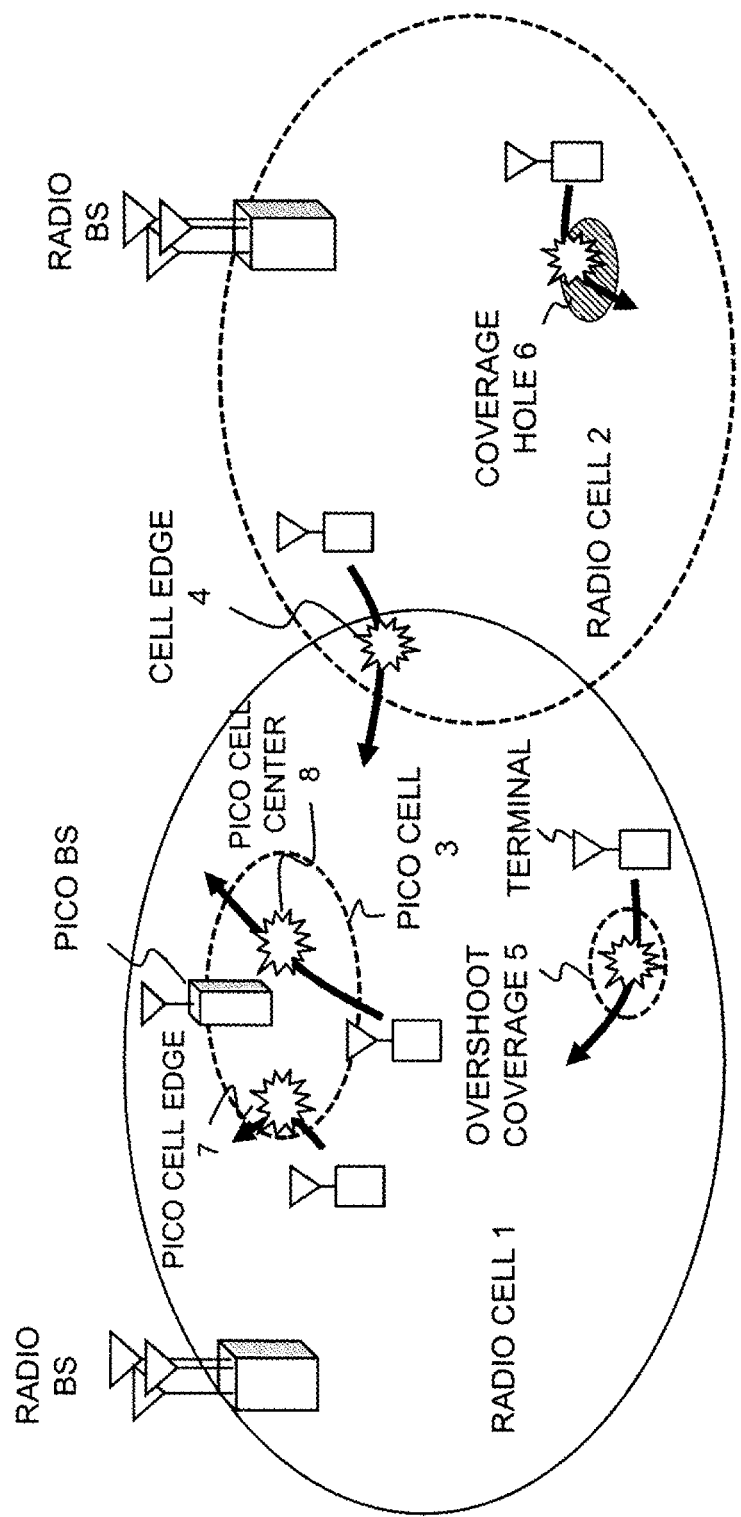
FIG. 1 is a schematic cell structure diagram for describing that problems to be dealt with vary with sites of occurrence.
Figure 2:
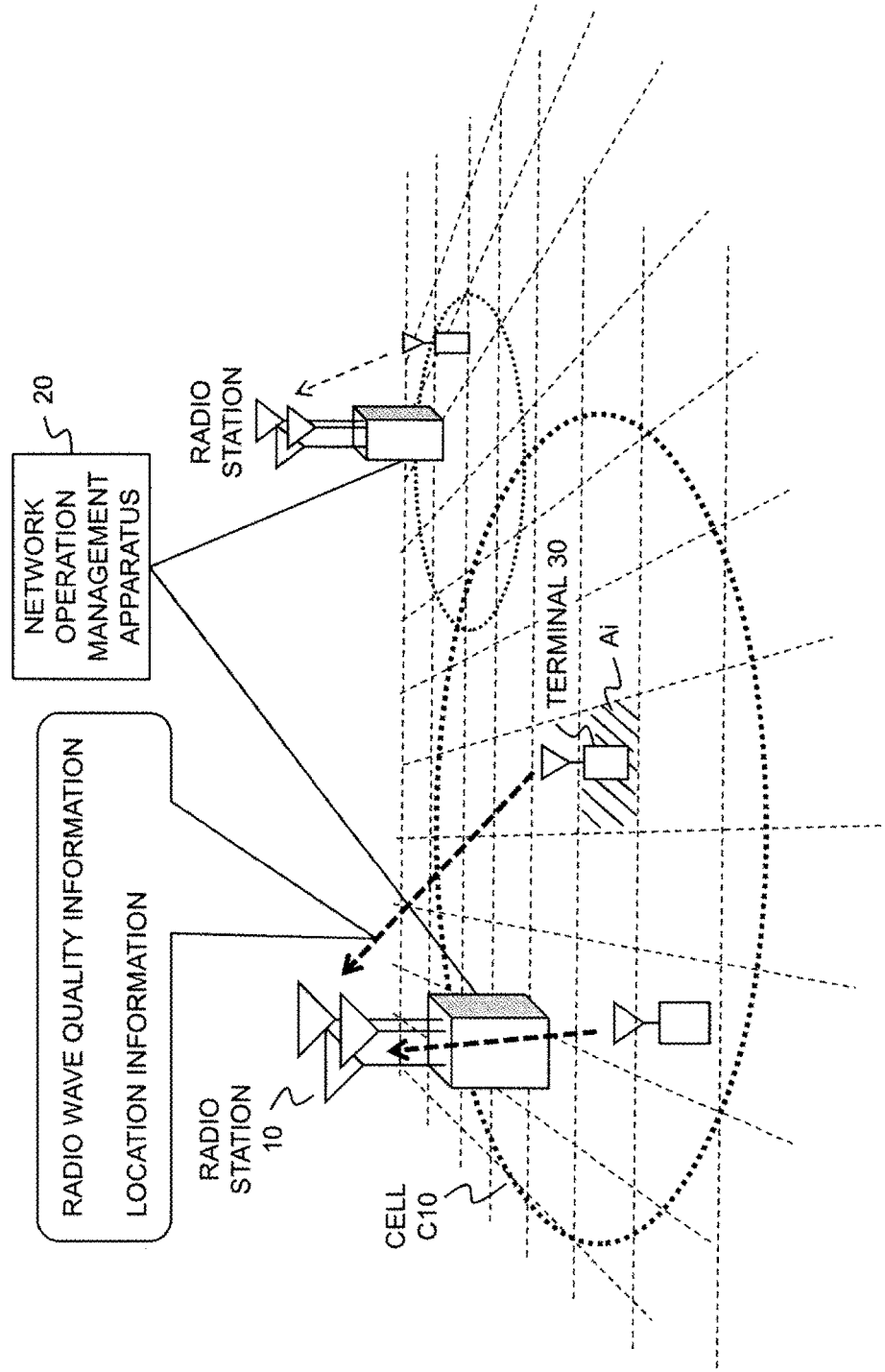
FIG. 2 is a schematic system architecture diagram of a radio parameter control system according to a first exemplary embodiment of the present invention.

Referring to FIG. 2, a radio communication system will be taken as an example which includes a plurality of radio stations 10 and terminals 30, wherein the plurality of radio stations are managed by a network operation management apparatus 20. A terminal 30, located in a cell C10 managed by a radio station 10, measures the quality of radio waves from the radio station 10 and reports to the radio station 10 measured radio wave quality information and its location information at the time of measurement. Note that the location information at the time of measurement may be any of, for example, location information acquired by the radio terminal when it measures radio wave quality information, latest location information held by the radio terminal when it measures radio wave quality information, location information acquired by the radio terminal when it stores (i.e., records in a memory) measured radio wave quality information, and latest location information held by the radio terminal when it stores measured radio wave quality information.

The terminals 30 are terminals in radio connected state (RRC Connected in LTE, or CELL_DCH, CELL_FACH in UMTS) or in idle state (RRC Idle in LTE, or Idle, CELL_PCH, URA_PCH in UMTS). A terminal 30, if in radio connected state, can report measured data to the concerned radio stations 10 in immediate reporting mode (Immediate MDT) and, if it is in idle state, can record measured data and report the measured data to the concerned radio stations 10 when a radio connection is established, in recording and reporting mode (Logged MDT). However, a method for collecting location information on radio terminals is not limited to MDT, but another method (for example, Secure User Plane Location: SUPL, Location Service: LCS) may be used for collection. Note that the radio stations 10 are radio base stations (eNode B: eNB in LTE, or Node B: NB in UMTS) that control cells C10, or control stations (Radio Network Controller: RNC in UMTS, or Operation and Maintenance (OAM) server) that control such radio base stations. A terminal 30 is a mobile station, user equipment (UE), or the like that is capable of radio connecting to radio base stations, such as a mobile telephone, mobile information terminal, or the like.

1.2) Operations

A radio parameter control function according to the present exemplary embodiment can be provided to any one or both of the radio stations 10 and the network operation management apparatus 20 and executes operations as described below.

Figure 3:
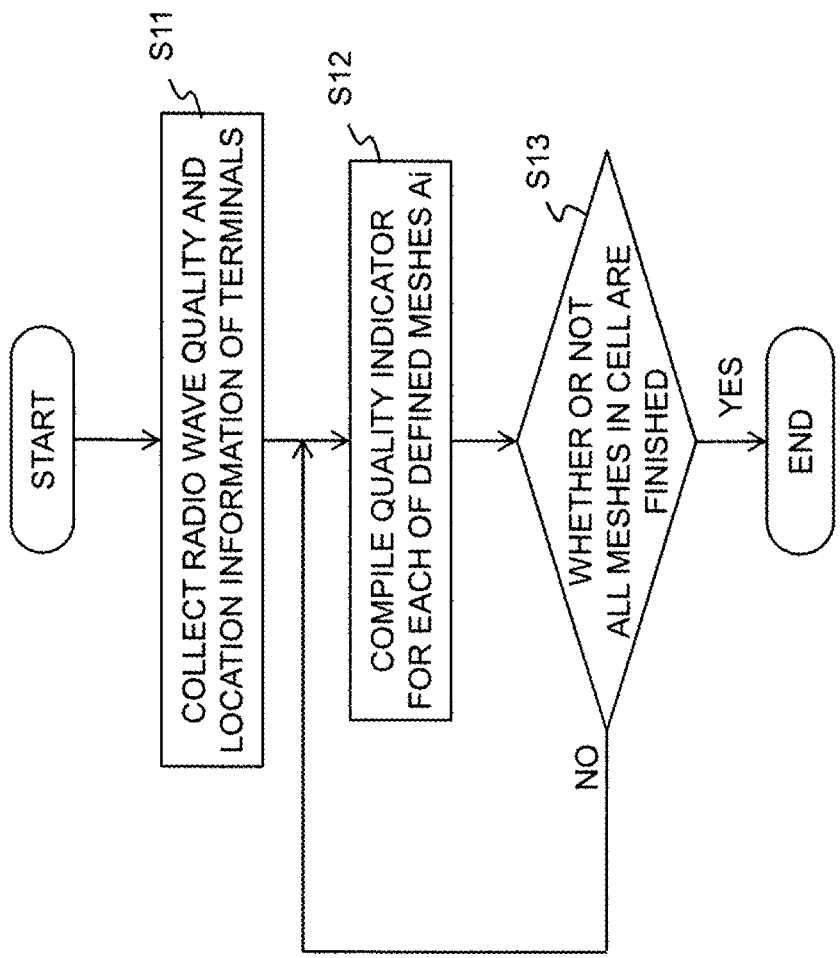
FIG. 3 is a flowchart showing a radio parameter control method according to the first exemplary embodiment.

Referring to FIG. 3, first, radio wave quality information and location information reported from terminals 30 and measurement information from radio stations are collected (Operation S11).

For the radio wave quality, for example, RSRP (Reference Signal Received Power), RSRQ (Reference Signal Received Quality), RSSI (Received Signal Strength Indicator), RSCP (Received Signal Code Power) of a CPICH (Common Pilot Channel), Ec/No (The received energy per chip divided by the power density), SI(N)R (Signal to Interference (and Noise) Ratio), or the like may be used.

Location information on a radio terminal can be acquired as, for example, information of GNSS (Global Navigation Satellite System) such as GPS (Global Positioning System). Alternatively, it is also possible to estimate a location based on the strength of radio waves from a plurality of neighbor radio base stations, or based on differences in arrival time between signals from a plurality of radio base stations (Observed Time Difference of Arrival: OTDOA), or based on differences in arrival time between signals to a plurality of radio base stations (Uplink Time Difference of Arrival: UTDOA). For the location information, for example, the latitude and longitude, or the x and y coordinates in the UTM (Universal Transverse Mercator) coordinate system or 19-coordinate system may be used, and preferably the z coordinate (altitude information) is further included.

Subsequently, quality indicators are compiled for each of predefined areas (hereinafter, referred to as meshes) Ai (Operation S12).

A mesh is an area as a unit of compilation, and it is sufficient that a mesh is an area smaller than a cell C10. One mesh corresponds to one area that has a geographical range based on location information such as the latitude and longitude. A plurality of meshes can cover at least part or the whole of one cell or a plurality of cells. The shape of a mesh is not necessarily a rectangle as shown in FIG. 2. Further, meshes may differ in size within a cell or between cells. Note that for convenience, an area defined by a plurality of areas (a plurality of meshes) will be referred to as a secondary area (a secondary mesh) hereinafter.

A quality indicator is information related to quality of communication between a radio station 10 and a terminal 30. The following examples may be used as such a quality indicator: the above-described radio wave quality; or statistical communication quality (KPI (Key Performance Indicator)) such as the number or rate of handover failures, the number or rate of handover successes, the number or rate of ping-pong HOs, or types of handover failures (Too Late HO, Too Early HO, HO To Wrong Cell). Note that the statistical communication quality (KPI) is also referred to as statistical quality of network, communication quality indicator, communication evaluation indicator, or the like. Moreover, compilation of quality indicator is statistical processing on quality indicators, including, for example, compilation of handover failures by type, generation of the CDF (Cumulative Distribution Function) of radio wave quality, and the like. Specific examples will be described later.

Subsequently, it is determined whether or not the above-described Operation S12 for compilation is completed with respect to all meshes in the cell (Operation S13). When a mesh to be subjected to compilation remains (Operation S13; NO), Operation S12 is repeated. When all meshes are finished (Operation S13; YES), the processing is completed. Note that compilation does not need to be performed for all defined meshes, but Operation S12 for compilation may be configured to be performed for all meshes where location information is collected.

1.3) Example of System Architecture

Next, a description will be given of a specific architecture of the system in which the above-described radio parameter control function is provided to the network operation management apparatus 20, with reference to FIG. 4. The radio parameter control function may be provided to the radio stations 10 or a network device other than the network operation management apparatus 20, as described already.

Figure 4:
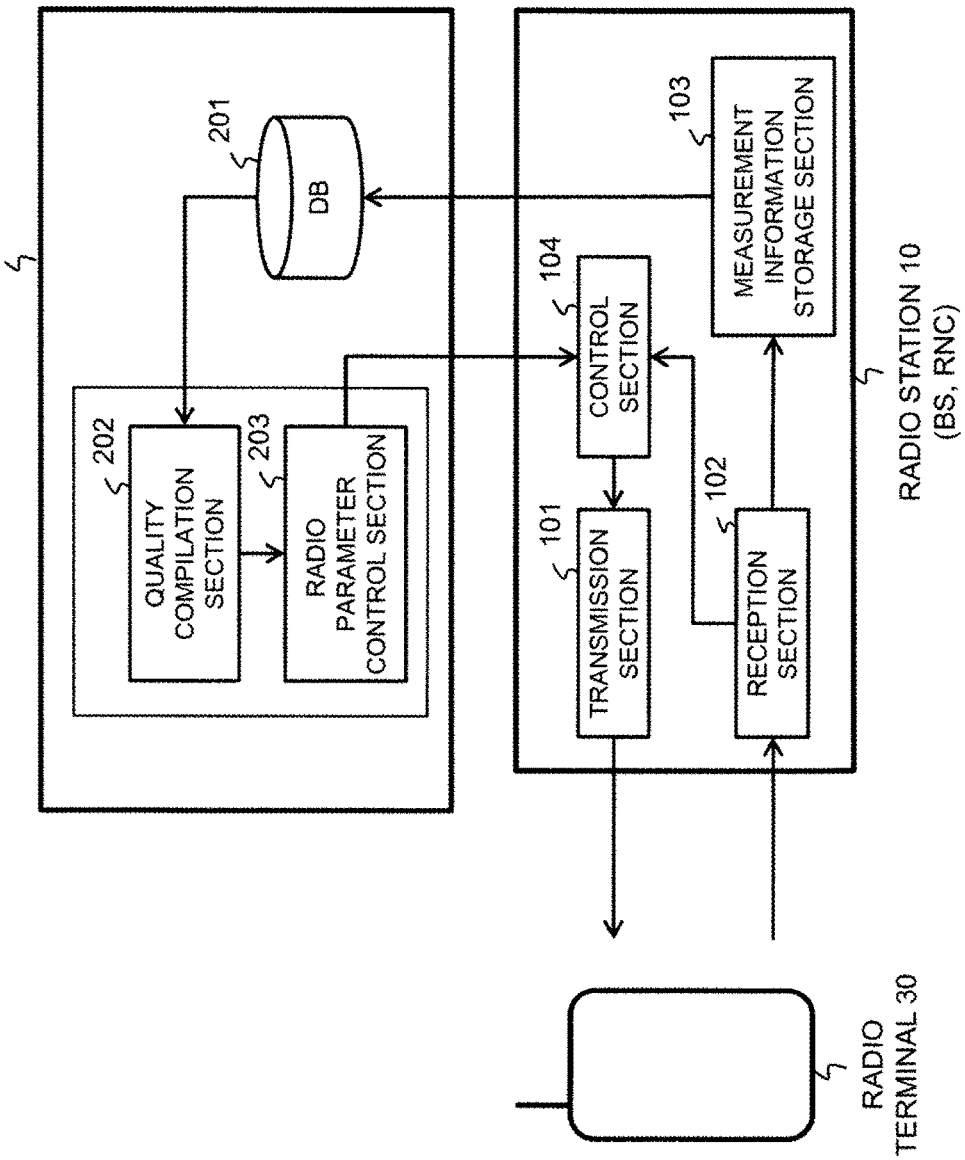
FIG. 4 is a block diagram showing a functional configuration of the radio parameter control system according to the first exemplary embodiment.

Referring to FIG. 4, the radio station 10 is a radio base station or a radio network controller (RNC) and includes a transmission section 101, a reception section 102, a measurement information storage section 103, and a control section 104. The transmission section 101 and the reception section 102 constitute a radio communication section for radio communicating with the radio terminals 30. The measurement information storage section 103 stores measurement information (radio wave quality and location information) collected from the terminals 30 and measurement information acquired by the radio station 10. The control section 104 controls compilation of measurement information and communication with the terminals 30, and also performs radio parameter control on the transmission section 101 and the like in accordance with an instruction from the network operation management apparatus 20.

The network operation management apparatus 20 according to the present exemplary embodiment includes a quality compilation section 202 and a radio parameter control section 203 that perform radio parameter control according to the present exemplary embodiment, in addition to a database 201, a quality compilation section 202, and a radio parameter control section 203. The database 201 stores measurement information collected from the radio stations 10. The quality compilation section 202 compiles the above-mentioned quality indicators for each mesh based on the collected measurement information, as described above. Based on a result of the compilation, the radio parameter control section 203 controls radio parameters for the radio stations 10.

Note that when a terminal 30 reports radio wave quality and location information at the time of measurement to a radio station 10, it is also possible that the terminal 30 collects radio wave qualities per predefined mesh and reports them to a radio network (for example, a radio station). Alternatively, radio wave quality and location information are not concurrently collected, but it is also possible that, for example, radio wave quality is collected periodically, whereas location information is collected periodically or each time a terminal reports the location information to a radio station. Moreover, it is also possible that in addition to radio wave quality and location information, for example, throughput is collected periodically or when a communication is completed.

Furthermore, information on a handover success and failure may be collected each time a handover is carried out. In this case, location information is location information held by a radio terminal at the time of a handover failure, before a failure, or at the time of reconnection.

1.4) Compilation of Quality Indicators and Grasp of Problems

Figure 5:
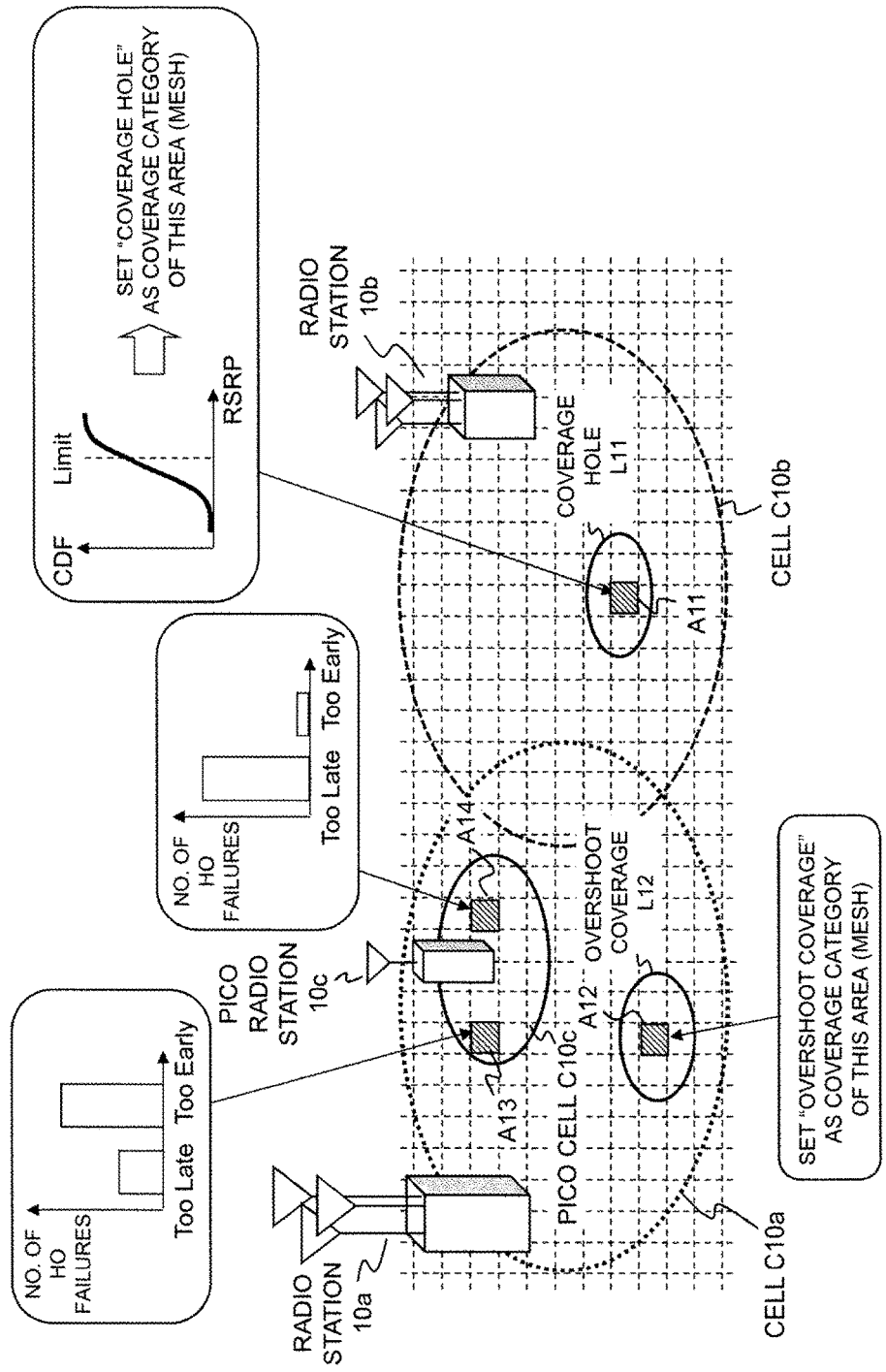
FIG. 5 is a schematic cell structure diagram for describing a concrete example of compiling quality indicators and grasping problems in the first exemplary embodiment.

Next, a description will be given of the compilation of quality indicators and grasp of problems, with references to a cell structure as illustrated in FIG. 5. In the cell structure shown in FIG. 5, it is assumed that a radio cell C10$a$ managed by a radio station 10$a$ and a radio cell C10$b$ managed by a radio station 10$b$ are adjacent to each other, that a radio coverage hole L11 exists within the radio cell C10$b$, and that a radio overshoot coverage L12 and a pico cell C10$c$ managed by a pico radio station 10$c$ exist within the radio cell C10$a$. Here, the coverage hole L11 is an area where radio waves of the radio station 10$b$ do not reach within the cell C10$b$ due to an obstacle to radio waves such as a building, whereas the overshoot coverage L12 is an area where radio waves of another cell are the strongest, rather than radio waves of the cell C10$a$, or an area where radio waves of another cell most meet a cell selection criterion or a cell reselection criterion.

Compilation of quality indicators as described above makes it possible to grasp communication quality or the type of a problem for each mesh. For example, for a mesh A11 in FIG. 5, "coverage hole" is set as the coverage category of this mesh A11, based on a result of compilation of the quality indicators (CDF of RSRP). For a mesh A12 in FIG. 5, since radio waves from another cell present the highest quality, "overshoot coverage" is set as the coverage category of the mesh A12. Moreover, a problem in a mesh A13 located at an edge of the pico cell can be distinguished from a problem in a mesh A14 located at the center of the pico cell by adding up handover failures with factors for the handover failures being classified as Too Late HO and Too Early HO. This makes it possible that, for example, different adjustments to handover triggers are made respectively, thereby solving the handover failure problems.

In this manner, it can be thought that the quality indicators compiled for each mesh are utilized to, for example, detect a problem and determine a counter-measure for each mesh of interest. As examples of the counter-measure, when a coverage-related problem is detected, coverage optimization is performed in which the transmission power of the base station is increased or decreased, or the antenna tilt angle is raised or lowered, whereas when a handover-related problem is detected, handover optimization is performed in which an offset value, a threshold value, or trigger time (Time To Trigger: TTT) used in measurement reports of terminals on radio wave quality is increased or decreased. For the offset value, for example, CIO (Cell Individual Offset), ax-offset (an offset used in Event Ax), or the like can be used. For the threshold value, ax (by)-threshold (Event Ax (By)) can be used. Here, Event Ax (By) corresponds to, for example, any of the following events related to measurement reports of terminals, which are prescribed in LTE.

Event A1: Serving becomes better than absolute threshold
Event A2: Serving becomes worse than absolute threshold
Event A3: Neighbour becomes amount of offset better than PCell
Event A4: Neighbour becomes better than absolute threshold
Event A5: PCell becomes worse than absolute threshold1 AND Neighbour becomes better than another absolute threshold2
Event A6: Neighbour becomes amount of offset better than SCell
Event B1: Neighbour becomes better than absolute threshold
Event B2: PCell becomes worse than absolute threshold) AND Neighbour becomes better than another absolute threshold2

Note that in case of UMTS as well, events related to measurement reports of terminals are prescribed similarly, and it is needless to say that the present invention is applicable similarly.

Note that in the case where quality indicators are compiled for each mesh Ai, for example, it is possible to link map information indicating geographical features such as roads (wide, narrow, intersection), buildings, rivers, and the like. The use of geographical features makes it possible to adopt a most suitable counter-measure against each problem such as handover failure or throughput degradation, which will be described later.

1.5) Effects

As described above, according to the first exemplary embodiment of the present invention, quality indicators, which are based on radio wave quality information included in measurement reports from the radio terminals 30 and measurement by the radio stations, are compiled in association with areas (meshes) narrower than units of cells by using location information included in the measurement reports. The quality indicators are compiled in this manner, whereby it is possible to accurately grasp problems varying by site of occurrence. Thus, it is possible to appropriately perform radio parameter control to deal with the grasped problem.

2. Second Exemplary Embodiment

According to a second exemplary embodiment of the present invention, based on a result of compilation of quality indicators obtained according to the above-described first exemplary embodiment, a policy against a problem is determined for each mesh, and based on this, the radio parameter control policy of a radio station is determined. Hereinafter, the second exemplary embodiment of the present invention will be described in detail with reference to FIGS. 6 to 11.

2.1) Radio Parameter Control

A radio parameter control function according to the present exemplary embodiment can be provided to any one or both of radio stations 10 and a network operation management apparatus 20 and executes operations as described next.

Figure 6:
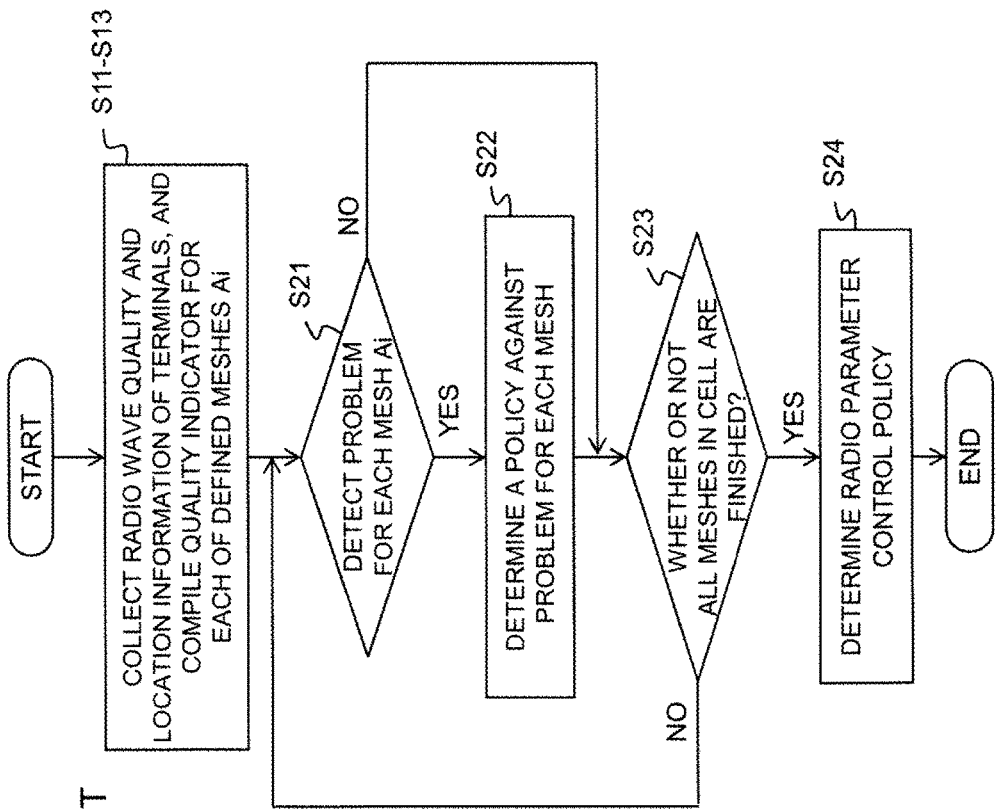
FIG. 6 is a flowchart showing a radio parameter control method according to a second exemplary embodiment of the present invention.

Referring to FIG. 6, it is assumed that a result of compilation of quality indicators has been generated for each mesh Ai through Operations S11 to S13 described in FIG. 3. Subsequently, it is determined for each mesh whether or not there is a problem (Operation S21). When there is a problem (Operation S21; YES), a policy against the problem is determined for each mesh (Operation S22). When there is no problem (Operation S21; NO), Operation S22 is skipped over. Note that a specific example of Operation S22, in which the policy against a problem is determined for each mesh, will be described later.

Subsequently, the radio parameter control device determines whether or not the above-described Operations S21 and S22 are completed with respect to all meshes within a cell (Operation S23). If a mesh to be subjected to the processing remains (Operation S23; NO), the control returns to Operation S21. When all meshes are finished (Operation S23; YES), a radio parameter control policy to be ultimately executed is determined and the process is completed (Operation S24). Note that compilation does not need to be performed for all defined meshes, but Operations S21 and S22 may be configured to be performed for all meshes where location information is collected, or for all meshes for which a result of compilation is generated.

Note that a range for which compilation is performed and for which a radio parameter control policy is determined, may be each cell or may span (be across) a plurality of cells. Moreover, it is sufficient that the range of a mesh, which is a unit of compilation and a unit of determination of the policy against a problem, is at a level finer than a cell, and accordingly meshes within a cell do not need to be equal in size. When compilation is performed or a counter-measure against a problem is determined for each mesh, it is possible to link map information indicating geographical features such as roads (wide, narrow, intersection), buildings, rivers, and the like. The use of geographical features makes it possible to adopt a most suitable counter-measure against each problem such as handover failure or throughput degradation, which will be described later.

Further, when a terminal 30 reports radio wave quality and location information at the time of measurement to a radio station 10, it is also possible that the terminal 30 collects radio wave quality for each of predefined meshes and reports them to a radio network (for example, a radio station). Alternatively, radio wave quality and location information are not concurrently collected, but it is also possible that, for example, radio wave quality is collected periodically, whereas location information is collected periodically or each time a terminal reports the location information to a base station. Moreover, it is also possible that in addition to radio wave quality and location information, for example, throughput is collected periodically or when a communication is completed.

Furthermore, information on a handover success and failure may be collected each time a handover is carried out. In this case, location information on a radio terminal is location information held by the radio terminal at the time of a handover failure, before a failure, or at the time of reconnection.

2.2) Example of System Architecture

Next, a description will be given of a specific architecture of a radio communication system in which the above-described radio parameter control function is provided to a network operation management apparatus, with reference to FIG. 7. The radio parameter control function may be provided to the radio stations 10 or a network device other than the network operation management apparatus, as described already. Note that the same functional blocks as those of the system shown in FIG. 4 are given the same reference signs and a description thereof will be omitted.

Figure 7:
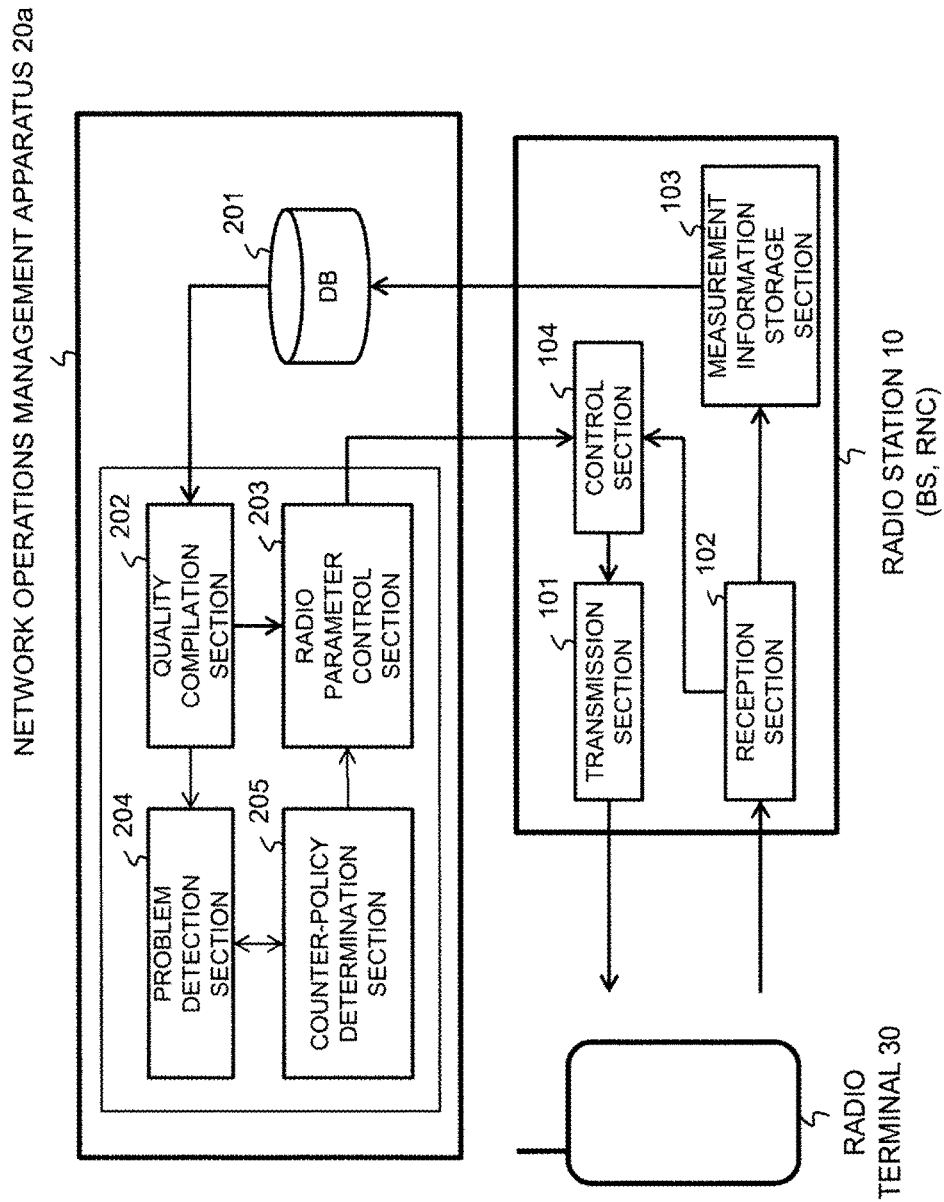
FIG. 7 is a block diagram showing a functional configuration of a radio parameter control system according to the second exemplary embodiment.

Referring to FIG. 7, a network operation management apparatus 20a according to the present exemplary embodiment is different from the network operation management apparatus 20 according to the first exemplary embodiment in that a problem detection section 204 and a counter-policy determination section 205 are added. The problem detection section 204 determines the presence/absence of a problem and the type thereof for each mesh by using the quality indicator compiled for each mesh Ai, as described above. The counter-policy determination section 205, when there is a problem, determines a suitable policy against the problem in accordance with the type of the problem, which will be described later. Note that determination of a policy against a problem may be performed for each secondary area, which spans (is across) a plurality of meshes.

2.3) Method for Determining Counter-Policy (First Example)

Figure 8:
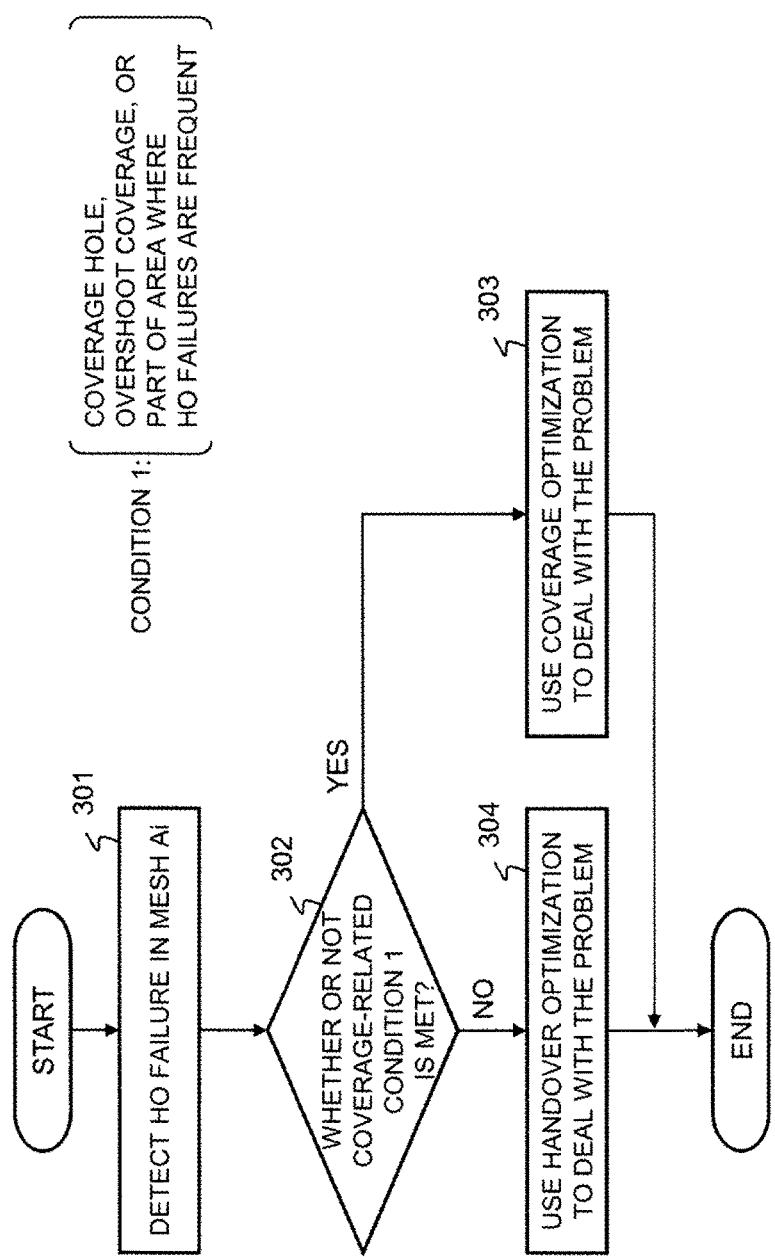
FIG. 8 is a flowchart showing a first example of a method for determining a counter-policy in the second exemplary embodiment.

Referring to FIG. 8, when a handover failure having occurred in a mesh Ai is detected (Operation 301), the counter-policy determination section 205 determines with respect to this handover failure whether or not an under-mentioned condition 1 is met (Operation 302). When the mesh meets the condition 1 (Operation 302; YES), coverage optimization is used to deal with the problem (Operation 303). Otherwise (Operation 302; NO), handover optimization is used to deal with the problem (Operation 304).

For example, the condition 1 is at least any one of the cases that the coverage category of the mesh is "coverage hole", that the coverage category of the mesh is "overshoot coverage", and that the mesh is part of an area where handover failures are frequent. Here, part of an area where handover failures are frequent is, for example, a case where the mesh of interest is located on a road line and handover failures also occur in another mesh located on this road line.

Through the method for determining a counter-policy shown in FIG. 8, it is possible to avoid a situation where handover performance in an entire cell contrarily degrades by controlling a handover-related radio parameter that is intended to reduce handover failures at a local site within the cell, such as a "coverage hole" or an "overshoot coverage". Note that determination of a "coverage hole" and an "overshoot coverage" can be accomplished by, but is not limited to, generation of a coverage map using location information acquired through MDT, or the like.

2.4) Method for Determining Counter-Policy (Second Example)

Figure 9:
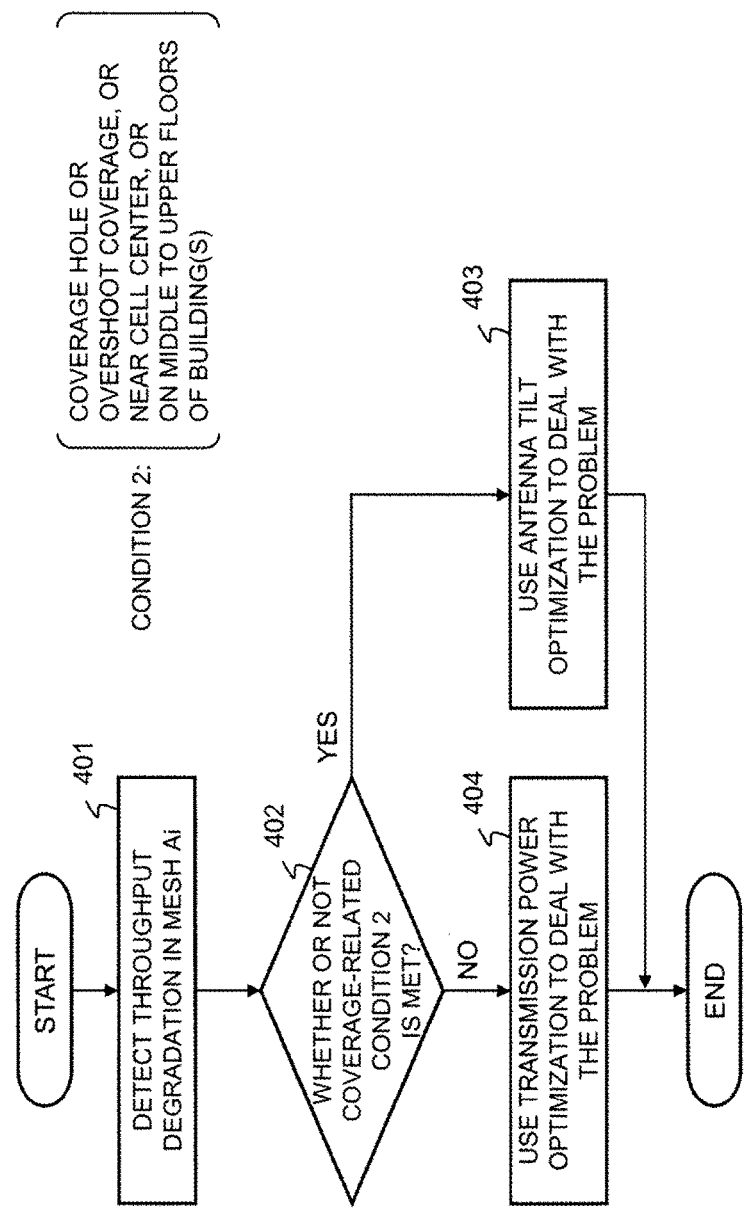
FIG. 9 is a flowchart showing a second example of the method for determining a counter-policy in the second exemplary embodiment.

Referring to FIG. 9, when a throughput degradation having occurred in a mesh Ai is detected (Operation 401), the counter-policy determination section 205 determines with respect to this throughput degradation whether or not an under-mentioned condition 2 is met (Operation 402). When the mesh meets the condition 2 (Operation 402; YES), antenna tilt optimization is used to deal with the problem (Operation 403). Otherwise (Operation 402; NO), transmission power optimization is used to deal with the problem (Operation 404).

For example, the condition 2 is at least any one of the cases that the coverage category of the mesh is "coverage hole", that the coverage category of the mesh is "overshoot coverage", that the mesh is near the center of a cell, and that the mesh spreads at or above a predetermined height (on middle to upper floors of a building or buildings). Here, determination as to whether or not the mesh is located on middle to upper floors can be accomplished conceivably by, for example, including altitude information in terminals' location information to be acquired through MDT or the like, or acquiring terminals' altitude information through another method such as Wi-Fi positioning, or the like.

Through the method for determining a counter-policy shown in FIG. 9, for example, coverage problems at sites where it is difficult to deal with the problems by transmission power optimization can be solved by antenna tile optimization.

2.5) Method for Determining Counter-Policy (Third Example)

Figure 10:
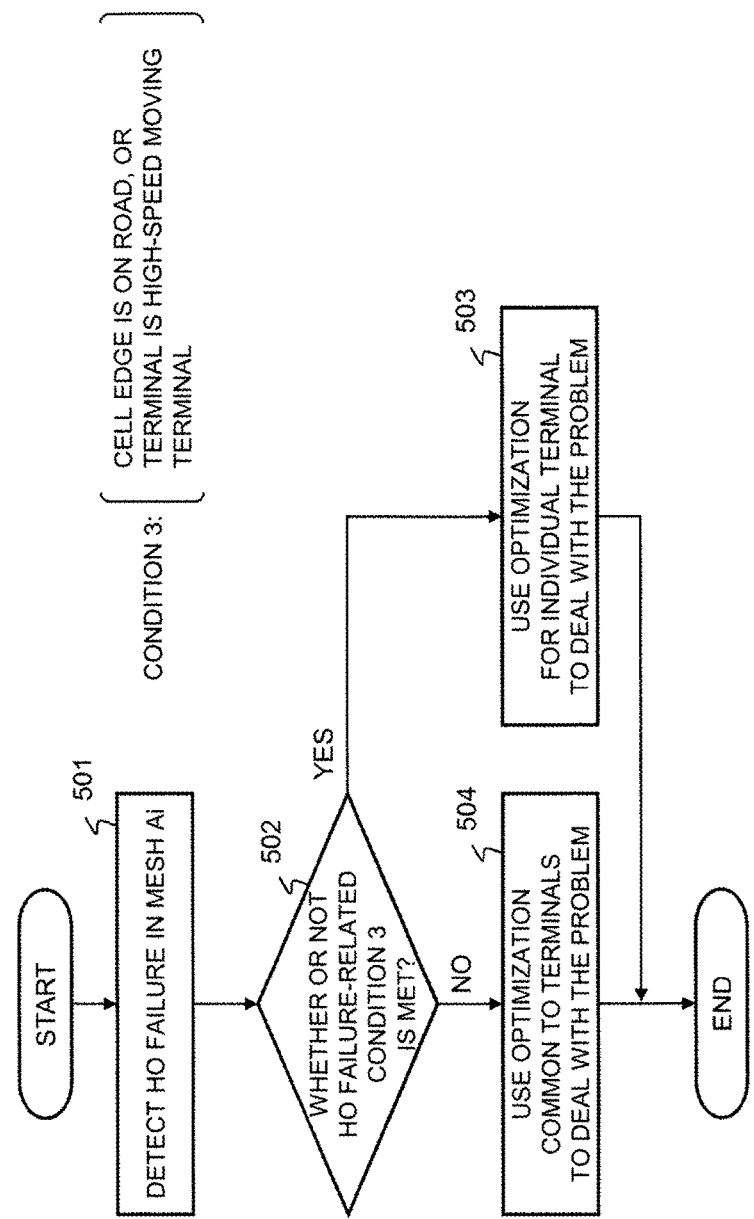
FIG. 10 is a flowchart showing a third example of the method for determining a counter-policy in the second exemplary embodiment.

Referring to FIG. 10, when a handover failure having occurred in a mesh Ai is detected (Operation 501), the counter-policy determination section 205 determines with respect to this handover failure whether or not an undermentioned condition 3 is met (Operation 502). When the mesh meets the condition 3 (Operation 502; YES), handover optimization for an individual terminal is used to deal with the problem (Operation 503). Otherwise (Operation 502; NO), handover optimization common to terminals, which is based on the statistics of handover failures in the cell, is used to deal with the problem (Operation 504).

For example, the condition 3 is at least any one of the cases that the handover failure is one occurring on a road at a cell edge, and that all (or a predetermined proportion or more of) handover failures in the mesh are those occurring to terminals moving at high speed. Note that determination as to whether the handover failure is one occurring on a road can be accomplished by, for example, using map information and location information.

Through the method for determining a counter-policy shown in FIG. 10, it is possible to avoid a situation where handover failures are contrarily increased by the setting of a radio parameter common to terminals in a cell that is intended to reduce handover failures occurring at a local site within the cell, or to reduce handover failures occurring only to a specific terminal.

2.6) Method for Determining Counter-Policy (Fourth Example)

In a fourth example of the method for determining a counter-policy, operations of the problem detection section 204 and the counter-policy determination section 205 shown in FIG. 7 are different from the above-described first to third examples. In the fourth example, after the counter-policy determination section 205 determines counter-policies for all meshes as described above in the first to third examples, a counter-policy is ultimately determined depending on whether or not the counter-policies for all meshes meet a condition.

Figure 11:
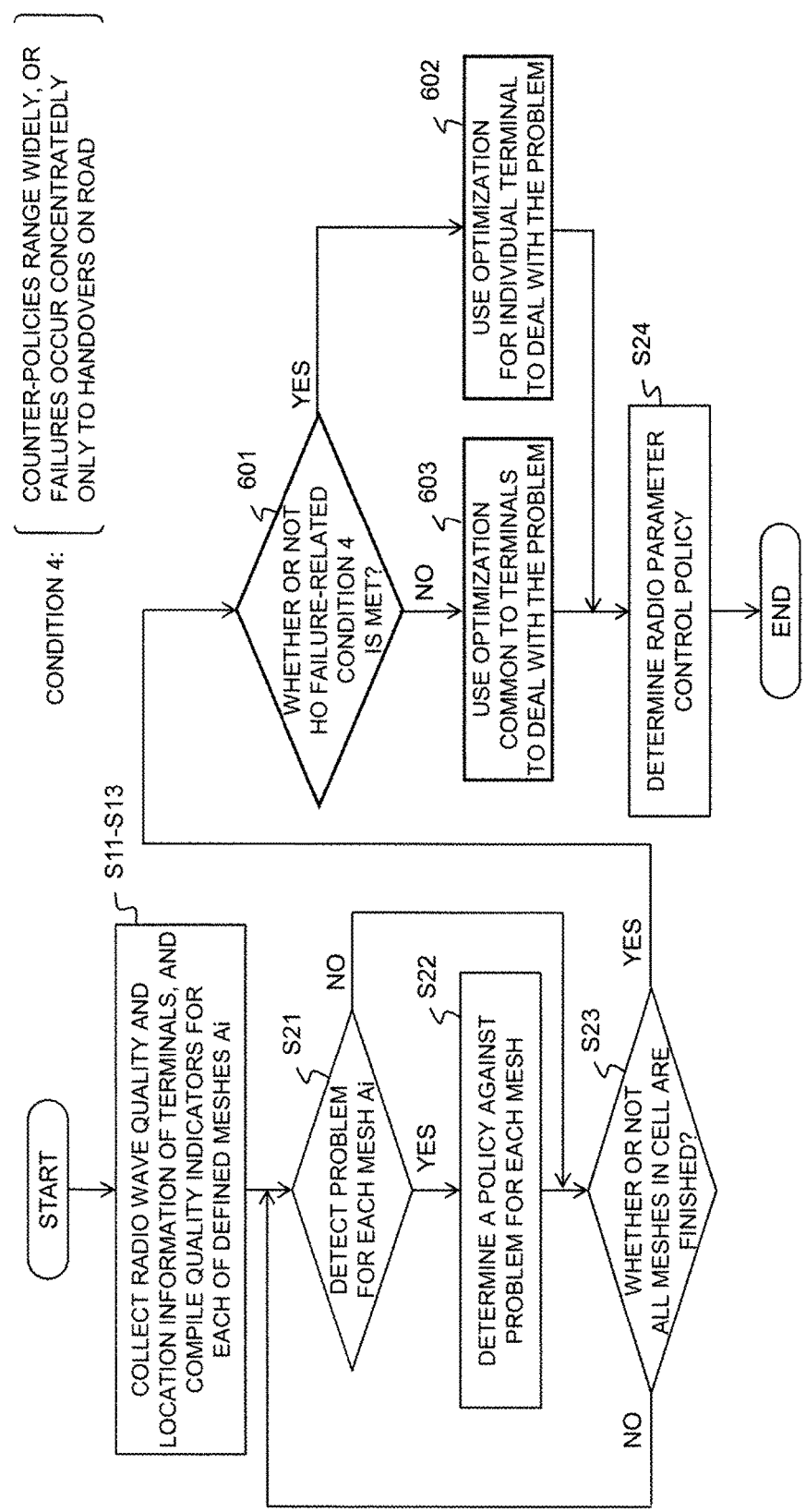
FIG. 11 is a flowchart showing a fourth example of the method for determining a counter-policy in the second exemplary embodiment.

Referring to FIG. 11, the same operations as in FIG. 6 are denoted by the same reference signs, and a description thereof will be omitted. First, when the counter-policy determination section 205 has determined counter-policies for all meshes (Operation S23; YES), it is determined for each mesh whether or not a policy against a handover failure occurring in the mesh meets an under-mentioned condition 4(Operation 601). If the condition 4is met (Operation 601; YES), handover optimization for an individual terminal is used to deal with the problem (Operation 602). When a handover of an individual terminal is performed, a counter-policy for a mesh in which the terminal UE to be handed over is currently located shall be conformed to. If the condition 4is not met (Operation 601; NO), handover optimization common to terminals, which is based on the statistics of handover failures in the cell, is used to deal with the problem (Operation 603).

For example, the condition 4is at least any one of the cases that counter-policies in the cell range widely, and that failures are concentrated only in handovers on a road at a cell edge. Counter-policies ranging widely is a case, or the like, where, for example, the locations (meshes) of handover failures distribute at random (unevenly) and the failures are caused by various factors.

Through the method for determining a counter-policy shown in FIG. 11, it is possible to achieve the most suitable setting of a radio parameter to reduce handover failures in a cell.

3. Others

According to the above-described first to third examples of the method for determining a counter-policy, a counter-policy is determined for each mesh. However, it is conceivable that counter-policies determined for individual meshes constitute contradictable controls within the same cell. For example, the following is conceivable: it is determined for a certain mesh that transmission power needs to be increased for coverage enlargement, while it is determined for another mesh that transmission power needs to be decreased for coverage contraction. In such a case, it is also possible that an ultimate radio parameter control policy is determined, taking account of which of the problems in the meshes should preferentially be solved.

Moreover, it is also possible to deal with problems by concurrently using the above-described first to third examples of the method for determining a counter-policy and giving priorities to the respective controls (or the conditions 1 to 3) of the examples. For example, it is also possible that counter-policies determined for individual meshes are compared to each other, and if a plurality of problems occur in the same mesh, it is prescribed beforehand which control (or condition) is given priority, so that an ultimate control policy is determined based on such prescriptions.

On the other hand, optimization may be performed for an entire cell when each mesh does not apply to any of the conditions in the first to third examples.

INDUSTRIAL APPLICABILITY

The present invention is applicable to a system for controlling radio parameters of a radio terminal or a radio base station in a radio communication system. That is, although a description is given mainly regarding an LTE system in the first and second exemplary embodiments, these exemplary embodiments may be applied to a radio communication system other than an LTE system, such as, for example, 3GPP UMTS, 3GPP2 CDMA2000 system (1×RTT, HRPD (High Rate Packet Data)), GSM (Global System for Mobile Communications) system, or WiMAX system.

REFERENCE SIGNS LIST

10 Radio station (radio base station, RNC)
20 Network operation management apparatus
30 Terminal
101 Transmission section
102 Reception section 103 Measurement information storage section
104 Control section
201 Database
202 Quality compilation section
203 Radio parameter control section
204 Problem detection section
205 Counter-policy determination section

The invention claimed is:

1. A system for controlling radio parameters of a radio cell that is controlled by a radio station, comprising:
a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
a second controller that is configured to determine a radio parameter control policy for each of the plurality of predefined areas or each of secondary areas, wherein the each of the secondary areas includes two or more of the plurality of predefined areas, and to control a radio parameter of the radio cell or across a plurality of radio cells, based on a result of compilation of the quality indicators for each of the plurality of predefined areas,
wherein for a handover failure occurring in the area, the second controller is further configured to decide on coverage optimization as the radio parameter control policy if a first condition is met, and decides on handover optimization as the radio parameter control policy if the first condition is not met, wherein the first condition is a case that the area of interest is a coverage hole, an overshoot coverage, or part of an area where handover failures are frequent.

2. The system according to claim 1, wherein the second controller is further configured to decide on handover optimization for an individual terminal as the radio parameter control policy if a fourth condition is met, and decides on handover optimization common to terminals in the cell as the radio parameter control policy if the fourth condition is not met, wherein the fourth condition is a case of various range of counter-policies determined with respect to handover failures occurring in the areas or a case that failures are concentrated in handovers on a road.

3. A system for controlling radio parameters of a radio cell that is controlled by a radio station, comprising:
a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
a second controller that is configured to determine a radio parameter control policy for each of the plurality of predefined areas or each of secondary areas, wherein the each of the secondary areas includes two or more of the plurality of predefined areas, and to control a radio parameter of the radio cell or across a plurality of radio cells, based on a result of compilation of the quality indicators for each of the plurality of predefined areas,
wherein for a throughput degradation occurring in the area, the second controller is further configured to decide on antenna tilt optimization as the radio parameter control policy if a second condition is met, and decides on transmission power optimization as the radio parameter control policy if the second condition is not met, wherein the second condition is a case that the area of interest is a coverage hole or an overshoot coverage, or is near a cell center, or spreads at or above a predetermined height.

4. A system for controlling radio parameters of a radio cell that is controlled by a radio station, comprising:
a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
a second controller that is configured to determine a radio parameter control policy for each of the plurality of predefined areas or each of secondary areas, wherein the each of the secondary areas includes two or more of the plurality of predefined areas, and to control a radio parameter of the radio cell or across a plurality of radio cells, based on a result of compilation of the quality indicators for each of the plurality of predefined areas,
wherein for a handover failure occurring in the area, the second controller is further configured to decide on handover optimization for an individual terminal as the radio parameter control policy if a third condition is met, and decides on handover optimization common to terminals in the cell as the radio parameter control policy if the third condition is not met, wherein the third condition is a case that the area of interest is on a road at a cell edge or that the terminal is a high-speed moving terminal.

5. A method for controlling radio parameters of a radio cell that is controlled by a radio station, comprising:
compiling quality indicators in association with a plurality of predefined areas, each of which is smaller than the radio cell, by using location information at a time of measurement included in a measurement report from a radio terminal, wherein the quality indicators are based on measurement information acquired by radio terminals in the radio cell or the radio station, wherein each of the plurality of predefined areas is an area as a unit of compilation; and
determining a radio parameter control policy for each of the plurality of predefined areas or each of secondary areas, wherein the each of the secondary areas includes two or more of the plurality of predefined areas, and controlling a radio parameter of the radio cell or across a plurality of radio cells, based on a result of compilation of the quality indicators for each of the plurality of predefined areas,
wherein for a handover failure occurring in the area, a controller decides on coverage optimization as the radio parameter control policy if a first condition is met, and decides on handover optimization as the radio parameter control policy if the first condition is not met, wherein the first condition is a case that the area of interest is a coverage hole, an overshoot coverage, or part of an area where handover failures are frequent.

6. The method according to claim 5, wherein handover optimization for an individual terminal is determined as the radio parameter control policy if a fourth condition is met, and handover optimization common to terminals in the cell is determined as the radio parameter control policy if the fourth condition is not met, wherein the fourth condition is a case of various range of counter-policies determined with respect to handover failures occurring in the areas or a case that failures are concentrated in handovers on a road.

7. A method for controlling radio parameters of a radio cell that is controlled by a radio station, comprising:
   compiling quality indicators in association with a plurality of predefined areas, each of which is smaller than the radio cell, by using location information at a time of measurement included in a measurement report from a radio terminal, wherein the quality indicators are based on measurement information acquired by radio terminals in the radio cell or the radio station, wherein each of the plurality of predefined areas is an area as a unit of compilation; and
   determining a radio parameter control policy for each of the plurality of predefined areas or each of secondary areas, wherein the each of the secondary areas includes two or more of the plurality of predefined areas, and controlling a radio parameter of the radio cell or across a plurality of radio cells, based on a result of compilation of the quality indicators for each of the plurality of predefined areas,
   wherein for a throughput degradation occurring in the area, antenna tilt optimization is determined as the radio parameter control policy if a second condition is met, and transmission power optimization is determined as the radio parameter control policy if the second condition is not met, wherein the second condition is a case that the area of interest is a coverage hole or an overshoot coverage, or is near a cell center, or spreads at or above a predetermined height.

8. A method for controlling radio parameters of a radio cell that is controlled by a radio station, comprising:
   compiling quality indicators in association with a plurality of predefined areas, each of which is smaller than the radio cell, by using location information at a time of measurement included in a measurement report from a radio terminal, wherein the quality indicators are based on measurement information acquired by radio terminals in the radio cell or the radio station, wherein each of the plurality of predefined areas is an area as a unit of compilation; and
   determining a radio parameter control policy for each of the plurality of predefined areas or each of secondary areas, wherein the each of the secondary areas includes two or more of the plurality of predefined areas, and controlling a radio parameter of the radio cell or across a plurality of radio cells, based on a result of compilation of the quality indicators for each of the plurality of predefined areas,
   wherein for a handover failure occurring in the area, handover optimization for an individual terminal is determined as the radio parameter control policy if a third condition is met, and handover optimization common to terminals in the cell is determined as the radio parameter control policy if the third condition is not met, wherein the third condition is a case that the area of interest is on a road at a cell edge or that the terminal is a high-speed moving terminal.

9. A network operation management apparatus managing a plurality of radio stations, comprising:
   a first controller that is configured to compile quality indicators in association with a plurality of predefined areas, each of which is smaller than a radio cell managed by a radio station, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control a radio parameter of the radio cell or across a plurality of radio cells, based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas,
   wherein for a handover failure occurring in the area, the third controller is further configured to decide on coverage optimization as the radio parameter control policy if a first condition is met, and decides on handover optimization as the radio parameter control policy if the first condition is not met, wherein the first condition is a case that the area of interest is a coverage hole, an overshoot coverage, or part of an area where handover failures are frequent.

10. The network operation management apparatus according to claim 9, wherein the third controller is further configured to decide on handover optimization for an individual terminal as the radio parameter control policy if a fourth condition is met, and decides on handover optimization common to terminals in the cell as the radio parameter control policy if the fourth condition is not met, wherein the fourth condition is a case of various range of counter-policies determined with respect to handover failures occurring in the areas or a case that failures are concentrated in handovers on a road.

11. A network operation management apparatus managing a plurality of radio stations, comprising:
   a first controller that is configured to compile quality indicators in association with a plurality of predefined areas, each of which is smaller than a radio cell managed by a radio station, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control a radio parameter of the radio cell or across a plurality of radio cells, based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas, wherein for a throughput degradation occurring in the area, the third controller is further configured to decide on antenna tilt optimization as the radio parameter control policy if a second condition is met, and decides on transmission power optimization as the radio parameter control policy if the second condition is not met, wherein the second condition is a case that the area of interest is a coverage hole or an overshoot coverage, or is near a cell center, or spreads at or above a predetermined height.

12. A network operation management apparatus managing a plurality of radio stations, comprising:
   a first controller that is configured to compile quality indicators in association with a plurality of predefined areas, each of which is smaller than a radio cell managed by a radio station, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control a radio parameter of the radio cell or across a plurality of radio cells, based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas,
   wherein for a handover failure occurring in the area, the third controller is further configured to decide on handover optimization for an individual terminal as the radio parameter control policy if a third condition is met, and decides on handover optimization common to terminals in the cell as the radio parameter control policy if the third condition is not met, wherein the third condition is a case that the area of interest is on a road at a cell edge or that the terminal is a high-speed moving terminal.

13. A radio station controlling a radio cell, comprising:
   a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control the radio parameter in the radio cell or across a plurality of radio cells based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas,
   wherein for a handover failure occurring in the area, the third controller is further configured to decide on coverage optimization as the radio parameter control policy if a first condition is met, and decides on handover optimization as the radio parameter control policy if the first condition is not met, wherein the first condition is a case that the area of interest is a coverage hole, an overshoot coverage, or part of an area where handover failures are frequent.

14. The radio station according to claim 13, wherein the third controller is further configured to decide on handover optimization for an individual terminal as the radio parameter control policy if a fourth condition is met, and decides on handover optimization common to terminals in the cell as the radio parameter control policy if the fourth condition is not met, wherein the fourth condition is a case of various range of counter-policies determined with respect to handover failures occurring in the areas or a case that failures are concentrated in handovers on a road.

15. A radio station controlling a radio cell, comprising:
   a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control the radio parameter in the radio cell or across a plurality of radio cells based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas,
   wherein for a throughput degradation occurring in the area, the third controller is further configured to decide on antenna tilt optimization as the radio parameter control policy if a second condition is met, and decides on transmission power optimization as the radio parameter control policy if the second condition is not met, wherein the second condition is a case that the area of interest is a coverage hole or an overshoot coverage, or is near a cell center, or spreads at or above a predetermined height.

16. A radio station controlling a radio cell, comprising:
   a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and
   a second controller that is configured to control the radio parameter in the radio cell or across a plurality of radio cells based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas, wherein for a handover failure occurring in the area, the third controller is further configured to decide on handover optimization for an individual terminal as the radio parameter control policy if a third condition is met, and decides on handover optimization common to terminals in the cell as the radio parameter control policy if the third condition is not met, wherein the third condition is a case that the area of interest is on a road at a cell edge or that the terminal is a high-speed moving terminal.

17. An apparatus for controlling radio parameters of a radio cell that is controlled by a radio station, comprising:

a first controller that is configured to compile quality indicators in association with a plurality of predefined areas, each of which is smaller than the radio cell, by using location information at a time of measurement included in a measurement report from a radio terminal in the radio cell, wherein the quality indicators are based on measurement information acquired by radio terminals in the radio cell or the radio station, wherein each of the plurality of predefined areas is an area as a unit of compilation; and a second controller that is configured to control a radio parameter of the radio cell or across a plurality of radio cells, based on a result of compilation of the quality indicators for each of the plurality of predefined areas, wherein the second controller comprises a third controller that is configured to determine a radio parameter control policy for each of the plurality of predefined areas or each of secondary areas based on the result of compilation of the quality indicators, wherein the each of the secondary areas includes two or more of the plurality of predefined areas, and wherein for a handover failure occurring in the area, the third controller is further configured to decide on coverage optimization as the radio parameter control policy if a first condition is met, and decides on handover optimization as the radio parameter control policy if the first condition is not met, wherein the first condition is a case that the area of interest is a coverage hole, an overshoot coverage, or part of an area where handover failures are frequent.

* * * * *